(12) United States Patent
Wieland et al.

(10) Patent No.: US 12,449,372 B2
(45) Date of Patent: Oct. 21, 2025

(54) LUMINAIRE ELEMENT FOR AN INSPECTION TUNNEL, LUMINAIRE STRIP, AND INSPECTION TUNNEL

(71) Applicant: Dürr Systems AG, Bietigheim-Bissingen (DE)

(72) Inventors: Dietmar Wieland, Waiblingen (DE); Wolfgang Tobisch, Stuttgart (DE); Andreas Danler, Völs (AT); Daniel Föger, Silz (AT); Manfred Gstrein, Absam (AT)

(73) Assignee: Dürr Systems AG, Bietigheim-Bissingen (DE)

( * ) Notice: Subject to any disclaimer, the term of this patent is extended or adjusted under 35 U.S.C. 154(b) by 290 days.

(21) Appl. No.: 17/919,131

(22) PCT Filed: Aug. 20, 2020

(86) PCT No.: PCT/DE2020/100727
§ 371 (c)(1),
(2) Date: Oct. 14, 2022

(87) PCT Pub. No.: WO2021/213561
PCT Pub. Date: Oct. 28, 2021

(65) Prior Publication Data
US 2023/0160833 A1 May 25, 2023

(30) Foreign Application Priority Data
Apr. 20, 2020 (DE) .................. 10 2020 110 722.6

(51) Int. Cl.
*G01N 21/88* (2006.01)
*F21V 3/00* (2015.01)
(Continued)

(52) U.S. Cl.
CPC .......... *G01N 21/8806* (2013.01); *F21V 3/00* (2013.01); *F21V 5/02* (2013.01); *F21V 5/08* (2013.01);
(Continued)

(58) Field of Classification Search
CPC ......... G01N 21/8806; G01N 2201/062; G01N 2021/8809; G01N 2021/8816;
(Continued)

(56) References Cited

U.S. PATENT DOCUMENTS 9,341,578 B2 * 5/2016 Porter ............... G01N 21/8806
2002/0064050 A1 5/2002 Yaphe et al.
(Continued)

FOREIGN PATENT DOCUMENTS

DE 4309727 9/1994
DE 202007013177 1/2008
(Continued)

OTHER PUBLICATIONS

German Patent and Trademark Office, "Search Report," issued in connection with German Patent Application No. 10 2020 110 722.6, dated Dec. 15, 2020, 17 pages. Rough Machine Translation Included.
(Continued)

*Primary Examiner* — William J Carter
(74) *Attorney, Agent, or Firm* — Hanley, Flight & Zimmerman, LLC

(57) ABSTRACT

The invention relates to a luminaire element (10, 11) for an inspection tunnel (100), in particular for checking shiny surfaces, in particular painted surfaces, comprising at least two, preferably strip-like, arrangements (12) of light sources (13) in a luminaire housing (14) having at least two edge regions (15) lying opposite one another along a longitudinal extension (L) of the luminaire housing (14), wherein the strip-like arrangements (12) of the light sources (13) are
(Continued)

formed along the longitudinal extension (L) at the edge regions (16), wherein a light exit surface (20) of the luminaire housing (14) has a higher radiation intensity along the edge regions (16) than in a central region (30). The invention further relates to a luminaire strip (50) having an arrangement of luminaire elements (10, 11) of this kind and to an inspection tunnel having an arrangement of a plurality of luminaire strips (50).

23 Claims, 8 Drawing Sheets

(51) Int. Cl.
| | | |
|---|---|---|
| *F21V 5/02* | (2006.01) | |
| *F21V 5/08* | (2006.01) | |
| *F21V 15/01* | (2006.01) | |
| *F21V 19/00* | (2006.01) | |
| *F21V 23/06* | (2006.01) | |
| *G01N 21/01* | (2006.01) | |
| *F21W 131/101* | (2006.01) | |
| *F21Y 103/10* | (2016.01) | |
| *F21Y 105/00* | (2016.01) | |
| *F21Y 115/10* | (2016.01) | |

(52) U.S. Cl.
CPC ............ *F21V 15/01* (2013.01); *F21V 19/005* (2013.01); *F21V 23/06* (2013.01); *G01N 21/8803* (2013.01); *F21W 2131/101* (2013.01); *F21Y 2103/10* (2016.08); *F21Y 2105/00* (2013.01); *F21Y 2115/10* (2016.08); *G01N 2021/0112* (2013.01); *G01N 2021/8816* (2013.01); *G01N 2021/8835* (2013.01); *G01N 2021/8845* (2013.01)

(58) Field of Classification Search
CPC ........... G01N 2021/8829; G01N 21/01; G01N 21/956; G01N 21/8803
See application file for complete search history.

(56) References Cited

U.S. PATENT DOCUMENTS

| | | | | |
|---|---|---|---|---|
| 2014/0254141 A1* | 9/2014 | McRae | ............... | G09F 13/0413 |
| | | | | 362/97.1 |
| 2015/0360271 A1* | 12/2015 | Hawkins | ............ | G01N 21/8806 |
| | | | | 362/219 |
| 2019/0113464 A1* | 4/2019 | Tingle | ................ | G01N 21/8803 |

FOREIGN PATENT DOCUMENTS

| | | |
|---|---|---|
| DE | 102014215481 | 2/2016 |
| DE | 102015116144 | 4/2016 |
| DE | 102015006012 | 11/2016 |
| EP | 0792452 | 3/1997 |
| WO | 2021213561 | 10/2021 |

OTHER PUBLICATIONS

International Searching Authority, "International Search Report and Written Opinion," issued in connection with International Patent Application No. PCT/DE2020/100727, mailed on Dec. 17, 2020, 17 pages. English Translation of the ISR Included.
International Searching Authority, "First Notice Informing the Applicant of the Communication of the International Application," issued in connection with International Patent Application No. PCT/DE2020/100727, mailed on Nov. 25, 2021, 1 page.

* cited by examiner

LUMINAIRE ELEMENT FOR AN INSPECTION TUNNEL, LUMINAIRE STRIP, AND INSPECTION TUNNEL

RELATED APPLICATION

This application is a national phase of International Application No. PCT/DE2020/100727, filed on Aug. 20, 2020, which claims the benefit of German Application No. 10 2020 110 722.6, filed on Apr. 20, 2020. The foregoing International Application and German Application are incorporated herein by reference in their entirety and for all purposes.

FIELD OF THE DISCLOSURE

Examples disclosed herein relate to a luminaire element for an inspection tunnel, to a luminaire strip having an arrangement of luminaire elements, and to an inspection tunnel having an arrangement of a plurality of luminaire strips.

BACKGROUND

Such inspection tunnels are used in vehicle production to inspect, in particular, painted surfaces of motor vehicles. In order to illuminate the workstations, in particular checking stations, on the one hand conventional luminaire elements on a frame substructure are used, which are equipped with fluorescent tubes and are arranged in a different arrangement at angles around the substrate, here the vehicle body or the body parts. These luminaire elements emit diffusely and generate a reflection image on the substrate by a corresponding reflector geometry of the luminaire elements. The orientation of these reflection images, and therefore also of the luminaire elements, is tailored to the special task of looking for faults and is in this case, inter alia, subordinate to ergonomic considerations. With this arrangement of luminaire elements, only a part of the energy used is exploited because of the creation of diffuse light. An increased dazzling effect may also occur for the inspectors.

On the other hand, there is another more recent configuration which is based on indirect illumination by single or multiple reflection by means of aluminum slats, onto which light-emitting diodes shine. In this case, horizontally extending slats, which produce a more or less pronounced reflection image on the substrate, are installed along the entire length of the checking station.

With this arrangement of luminaire elements, horizontally extending reflection stripes require active searching for reflection lines in the side region of the bodies by the inspector. Large differences in the luminance reflections may lead to a locally differently pronounced reflection line image and to unstable overall perception. Such luminaire arrangements may also be very expensive.

SUMMARY

It is an object of examples disclosed herein to present a luminaire element for an inspection tunnel, in particular for inspecting painted vehicle bodies, having an improved luminance distribution.

It is a further object to provide a luminaire strip having an arrangement of luminaire elements, which has an improved luminance distribution.

It is a further object to provide an inspection tunnel having an arrangement of a plurality of luminaire strips, which have an improved luminance distribution.

The objects are achieved by the features of the independent claims. Favorable configurations and advantages of examples disclosed herein may be found in the further claims, the description and the drawing.

According to one aspect of examples disclosed herein, a luminaire element for an inspection tunnel, in particular for checking glossy surfaces, in particular painted surfaces, is proposed, comprising at least two preferably stripe-like arrangements of light sources in a luminaire housing having at least two edge regions lying opposite one another along a longitudinal extent of the luminaire housing. The stripe-like arrangements of the light sources are in this case formed along the longitudinal extent at the edge regions, and a light exit surface of the luminaire housing has a higher radiant intensity along the edge regions than in a central region.

Advantageously, the described luminaire structure may lead to an improved luminance distribution with the aid of a new arrangement of the light sources in the luminaire housing.

Instead of positioning the light sources centrally with respect to the light exit surfaces as previously, and therefore obtaining a luminance decreasing slowly with a shallow gradient from the center to the edge regions, the light sources are fitted on the two edge regions of the luminaire housing, where the transition from the luminaire housing directly to maximum luminance allows a steep gradient of the luminance. This can increase the likelihood of detecting faults on or in the substrate to be examined, for example a painted surface. In addition, with this arrangement of the light sources large-area zones with a low and relatively homogeneous luminance are also formed. These regions can favor unperturbed inspection, that is to say free of high contrasts, of the surface on extensive fault images such as clouds, haze, holograms, etc. with significantly improved potential for attention of the inspector. Errors during the inspection may therefore be reduced.

Advantageously, an advantageous luminance distribution may be achieved by on the one hand high contrasts at the transition of the luminaire housing to the light exit surface and unperturbed, optically uniform regions.

A high system efficiency may be achieved with the low-loss radiation principle.

According to one advantageous configuration of the luminaire element, the light exit surface of the luminaire housing may comprise at least a diffuser and a cover lens. According to another advantageous configuration of the luminaire element, a multiprism lens may furthermore be arranged between the diffuser and the cover lens.

The luminaire structure is based on the principle of backlighting, the light rays passing before leaving the luminaire element through a lens stack, which preferably consists of a diffuse lens, a multiprism lens and a protective cover lens.

The multiprism lens may in this case, in particular, be used for additional reduction of a possible dazzling effect for the inspector.

According to one advantageous configuration of the luminaire element, the light sources may comprise one or more light-emitting diodes and/or one or more fluorescent tubes and/or one or more light guides.

Light-emitting diodes (LEDs), for example mid-power LEDs having a luminous flux of from 20 to 200 lumens and a luminous efficiency of about 180 lumens/watt, may preferably be used as lighting means. Alternatively, however, other designs may also be used according to the fluorescent tube concept. Light-emitting diodes and fluorescent tubes are very energy-efficient and long-lasting lighting means, and can therefore keep the operating costs low. When using light guides, the lighting means may be arranged at a central location and for example supplied favorably with energy, and also cooled.

According to one advantageous configuration of the luminaire element, the light sources may be configured with variable color, in particular as light-emitting diodes (LEDs) having an adjustable color temperature.

Light sources having LEDs with a variable color temperature may optionally be used. In this way, for example, the light color may be matched to the hue of the substrate or to the preference of the inspector. The LEDs may be mounted on a luminaire insert consisting of, for example to increase the reflection, white-painted sheet steel or sheet aluminum or a plastic sheet, and cabled. The associated drivers of the LEDs may, for example, be mounted on the rear side of the luminaire insert. In the event of a defect of the drivers or the LEDs, the luminaire housing may be opened from the rear side in order to replace the luminaire insert together with the LEDs and drivers. Rear-side opening of the housing may, for example, be carried out by removing a cover, which is fastened for example by means of screws on the housing body. The fastening of the cover may also alternatively be carried out by means of locking levers or the like. The luminaire inserts may for example be screwed, clamped or otherwise fastened in the luminaire housing.

The color temperature of the light sources in a luminaire element may either be fixed or, for example, vary between 2700 K (warm-white) and 6500 K (cold-white). For example, a "zebra arrangement" is also possible, in which alternately cold-white and warm-white luminaire elements or other sequences are used.

The luminaire elements may be configured to be dimmable. The degree of dimming may, for example, be tailored to the hue of the substrate. The hue of the luminaire element may be matched to the hue of the substrate.

According to one advantageous configuration of the luminaire element, the luminaire housing may comprise end-side terminal regions transversely to the edge regions, which are configured to connect neighboring luminaire elements. This way, a plurality of luminaire elements may favorably be assembled to form a longer luminaire strip, in order to examine larger substrates.

According to one advantageous configuration of the luminaire element, the end-side terminal regions may be configured as standardized terminal elements for mechanical and/or electrical connection of neighboring luminaire elements. In this way, a plurality of luminaire elements may be assembled efficiently to form a longer luminaire strip, in order to examine larger substrates.

According to one advantageous configuration of the luminaire element, the luminaire housing may be configured curved in the shape of an arc, the light exit surface being oriented toward a concave inner side of the arc-shaped curvature. Curved luminaire elements may favorably be assembled to form a curved luminaire strip in order to inspect large objects, for example in an inspection tunnel.

According to one advantageous configuration of the luminaire element, the central region of the light exit surface may have a lower transparency than the edge region; in particular, the central region may be configured opaquely.

In this way, zones with a high contrast may be achieved at the edge region of the luminaire element, in particular for the perception of point faults. Differently bright zones of the light exit surface may improve the recognition of extensive faults, for example clouds, haze, etc., in a painted surface.

In order to be able to generate a plurality of light stripes in the reflection image with a luminaire element, an opaque stripe or a plurality of stripes may for example be applied internally, for example centrally, on the light exit surface. This stripe may then advantageously be configured to be highly reflective toward the light source space. Under certain circumstances, it may also be advantageous to separate the space between the LEDs and the lens stack, with the aim of providing regions having different light colors. For this purpose, for example, a separating wall may divide this space, for example centrally. This separating wall may then also be configured to be highly reflective. In this case, the two LED strips on the right and left of the separating wall may then be configured with different color temperatures. Without a separating wall, different hues may also be produced by means of color filters, which may be placed in the region of the lens stack.

According to one advantageous configuration of the luminaire element, the luminaire housing may be configured to be openable on the rear side, and the luminaire housing may in particular be configured with a maintenance opening on the rear side. In this way, defective light sources and/or driver stages may be replaced easily, without having to fully dismount the luminaire element.

According to one advantageous configuration of the luminaire element, the light sources may be arranged on a carrier element. The carrier element is in particular configured to be reflective toward the light exit surface. In this way, the contrast of the emerging light beam can advantageously be increased in order to increase the reflection on the substrate to be examined. Different color temperatures of the light sources may thus also favorably be produced in the luminaire element According to one advantageous configuration of the luminaire element, the luminaire housing may be configured closed. Advantageously, the light sources may are arranged adhesively bonded on a carrier element. A further variant is that the luminaire housing is configured closed and designed as a "disposable lamp". The luminaire insert with light sources and drivers may then, for example, be adhesively bonded in the luminaire housing.

According to a further aspect of examples disclosed herein, a luminaire strip having an arrangement of luminaire elements is proposed, wherein the luminaire elements are connected to one another at their end-side terminal regions. In particular, the luminaire elements may in this case be arranged at least regionally on a line curved in the shape of an arc, the light exit surfaces of the luminaire elements being oriented toward a concave inner side of the arc-shaped curvature.

According to one advantageous configuration of the luminaire strip, end pieces may be formed by planar luminaire elements, between which curved luminaire elements are arranged.

The individual luminaire elements joined to form a luminaire strip, which may for example have an arc-like structure, may thus be screwed to one another on their end sides. For this purpose, for example, 6 bent luminaire elements, each with a length of 1420 mm, and 2 planar luminaire elements, each of 750 mm, may be used. Because the light exit surface approximately has the length of the luminaire housing, only minimal sections on which the light exit surface is interrupted are formed in the circumferential direction. With this virtually continuous light exit surface, a reflection image which is advantageous since it is almost uninterrupted may be formed on the substrate.

In order to combine individual luminaire elements having an individual length of for example 1400 mm to form a continuous luminaire strip, to avoid light-free regions these may be screwed together or plugged together on the head sides.

Here, for example, the energy supply and the control signals could, for example, be forwarded from one luminaire element to the next via the plug connection, in particular a standardized plug connection.

According to a further aspect of examples disclosed herein, an inspection tunnel having a tunnel longitudinal axis is proposed, in particular for checking glossy, in particular painted vehicle bodies, having an arrangement of a plurality of luminaire strips. In this case, the luminaire strips are arranged next to one another transversely to the tunnel longitudinal axis, the light exit surfaces of the luminaire elements being oriented on a concave inner side of the arc-shaped curvature of a tunnel wall toward a central region of the tunnel longitudinal axis.

By the concentric arrangement of the luminaire elements, the light rays are directed substantially onto the substrate, that is to say for example a painted vehicle body. This on the one hand increases the luminous efficiency, and on the other hand reduces the direct dazzling of the inspectors.

The width of the individual luminaire strips may for example be 200 mm, and the free space between the light arcs may for example be 500 mm. in this way, both a sufficiently large number of contrast transitions is available, and sufficient visually "unperturbed" space, which is likewise needed for inspection of the overall substrate.

Advantageously, by the use of the described luminaire strips with the luminaire elements according to examples disclosed herein in such an inspection tunnel, a vehicle body may be optically modulated out by the nature of the illumination.

The checking station may be able to be positively experienced by the inspector by virtue of the new type of illumination, which leads to better efficiency in the inspection of the substrate.

In this way, highly purposeful work tailored to the body is possible with a low fatigue effect. By a ratio devised in detail of the luminances of the inspection space to the environment, it is possible to achieve a low dazzling effect and therefore psychologically stable observation by the inspector.

Improved ergonomics due to a significantly reduced dazzling effect and reflection orientation may thus be implemented in such a way that no inconvenient (head) movements need to be performed when looking for faults.

More reliable inspection is made possible by virtue of an almost continuous reflection image on the body.

With the inspection tunnel according to examples disclosed herein, application possibilities are offered in the field of fault checking, for example of large substrates such as bodies or even completed vehicles. Furthermore, these checking stations may also be used for other substrates, such as fenders, mirror casings, etc. in addition, favorable possibilities of use are also offered other than use for checking paint, by uniform lighting of further workstations.

According to one advantageous configuration of the inspection tunnel, the luminaire strips may be arranged spaced apart in a predetermined grid spacing. In this way, favorable reflection patterns may be established for purposeful inspections of particular fault patterns of substrates. Fault checking may thus also be achieved favorably over a wide range from locally limited fault patterns to large-area fault patterns.

According to one advantageous configuration of the inspection tunnel, luminaire elements of different luminaire strips may comprise light sources with a different color temperature, particularly in the range of between 2700 K and 6500 K.

The color temperature may be constant within a luminaire strip and a neighboring luminaire strip may have a different color temperature. In particular, in this case neighboring luminaire strips may have alternating sequences of high and low color temperatures.

The light color of the light sources in a luminaire strip may either be fixed or, for example, vary between 2700 K (warm-white) and 6500 K (cold-white). For example, a "zebra arrangement" is also possible, in which alternately cold-white and warm-white luminaire strips or other sequences are used.

The luminaire elements may be configured to be dimmable. The degree of dimming may, for example, also be tailored to the hue of the substrate and may also match the hue of the luminaire element to the hue of the substrate.

According to one advantageous configuration of the inspection tunnel, regions between the luminaire strips may comprise surfaces with predetermined, in particular different reflectances. In particular, the material of the surface may in this case have reflectances of between 20% and 70%, preferably between 27% and 55%, in relation to a wavelength range of visible light and with normal light incidence.

Each light stripe generates above-described bright/dark contrast regions on the substrate due to entry into and exit from the light stripes, at the transition of which the faults, for example paint inclusions, which appear as a pointwise deviation of a planar surface, can be recognized as a line deformation.

In order to be able to perceive a sufficient contrast on bright, for example white, surfaces as well, a minimum contrast ratio of 1:1.7 has been determined for an exemplary environmental luminance. The layout of a luminaire element may be carried out on this basis. In order to provide a psychologically stable environment ("stable observation") under these conditions in the interfacial area of very bright and very dark substrates, the necessary reflectances of the materials which may be applied between the luminaire strips may be determined.

These reflectances may, for example, be between 27% and 55%, respectively in relation to a wavelength range of visible light and with normal light incidence.

It may also be advantageous to configure the space between the luminaire strips with matt panels, for example in the architectural colors according to Le Corbusier or other natural earth hues which impart a pleasant room ambience. The panels may for example be formed from textile, plastic, wood or sheet metal. A foil may be used as a coating with a hue.

According to one advantageous configuration of the inspection tunnel, at least one luminaire strip may be arranged extending parallel to the tunnel longitudinal axis, the light exit surfaces of the luminaire elements being aligned toward the tunnel longitudinal axis.

For the use of an inspection tunnel to be employed with large substrates, for example bodies, in addition to the luminaire strips extending transversely to the tunnel longitudinal axis, it may be advantageous also to use longitudinally extending luminaire strips of the same design. In this way, it is possible to generate further advantageous reflection patterns, or a contrast change on the substrate.

Especially for the inspection of, for example, hoods or trunk lids of a body, it may be advantageous to install longitudinally fitted luminaire strips since in that case a movement of the checker transversely to the body often takes place. With this natural movement of the checker transversely to the body, a bright/dark contrast change therefore takes place without additional head movement.

According to one advantageous configuration of the inspection tunnel, luminaire strips may be arranged in the floor in the tunnel longitudinal axis and/or transversely to the tunnel longitudinal axis.

If luminaire strips are used in the floor of the inspection tunnel, these may favorably be constructed in terms of luminance profile in a similar way to the luminaire strips fitted in the tunnel wall, and therefore join together to form a uniform reflection image on virtually all regions of the substrate, for example a body.

BRIEF DISCUSSION OF THE DRAWINGS

Further advantages may be found from the following description of the drawing. Exemplary embodiments of examples disclosed herein are represented in the drawings. The drawings, the description and the claims contain numerous features in combination. The person skilled in the art will also expediently consider the features individually and combine them to form suitable further combinations.

DETAILED DESCRIPTION OF THE DRAWINGS

In the figures, components which are the of the same type or have the same effect are numbered with the same references. The figures merely show examples and are not to be interpreted as restrictive.

In what follows, direction terminology with terms such as "left", "right", "up", "down", "before", "behind", "after" and the like is used only for better understanding of the figures and is in no case intended to constitute a restriction of generality. The components and elements represented, their layout and their use may vary in the sense of the considerations of a person skilled in the art and be adapted to the respective applications.

Figure 1:
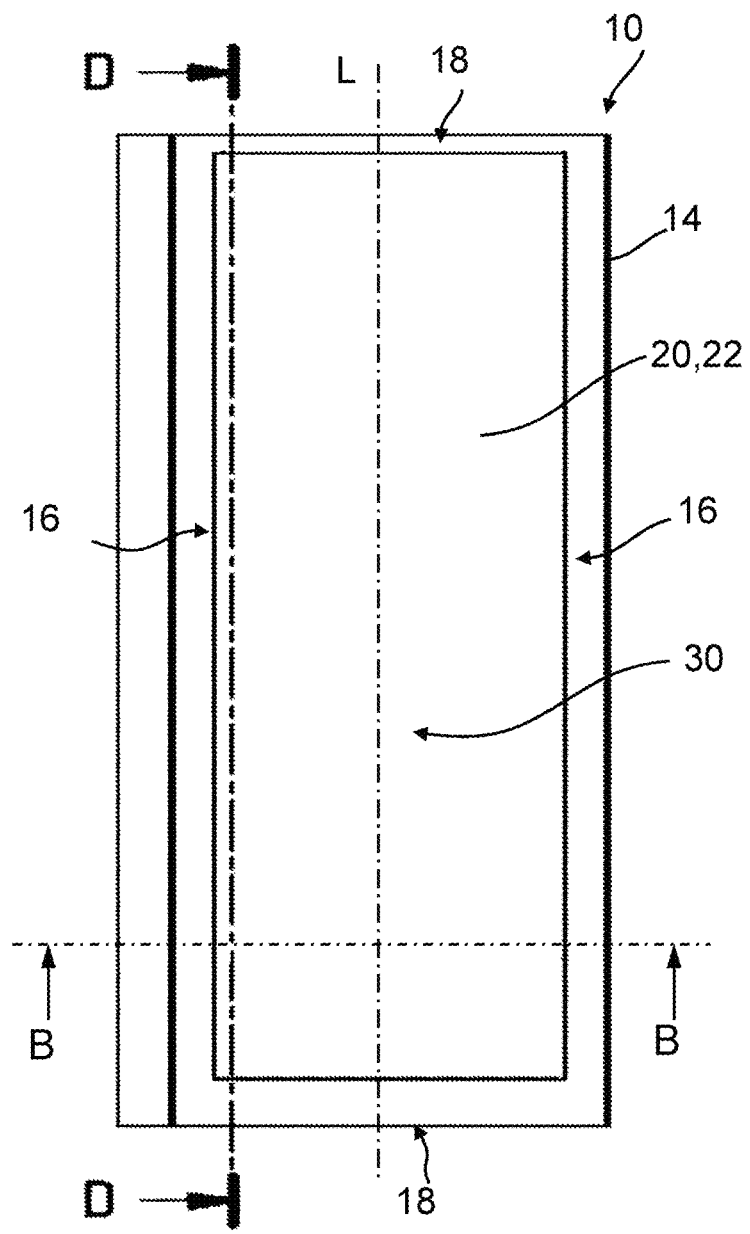
FIG. 1 shows a plan view of a luminaire element according to one exemplary embodiment of examples disclosed herein with section lines B-B and D-D indicated.
Figure 2:
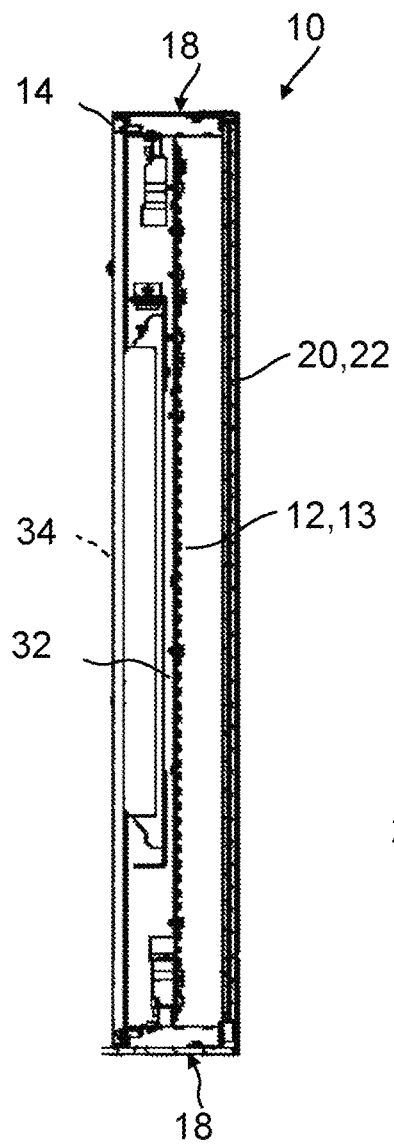
FIG. 2 shows a longitudinal section through the luminaire element in the section plane D-D according to FIG. 1.
Figure 3:
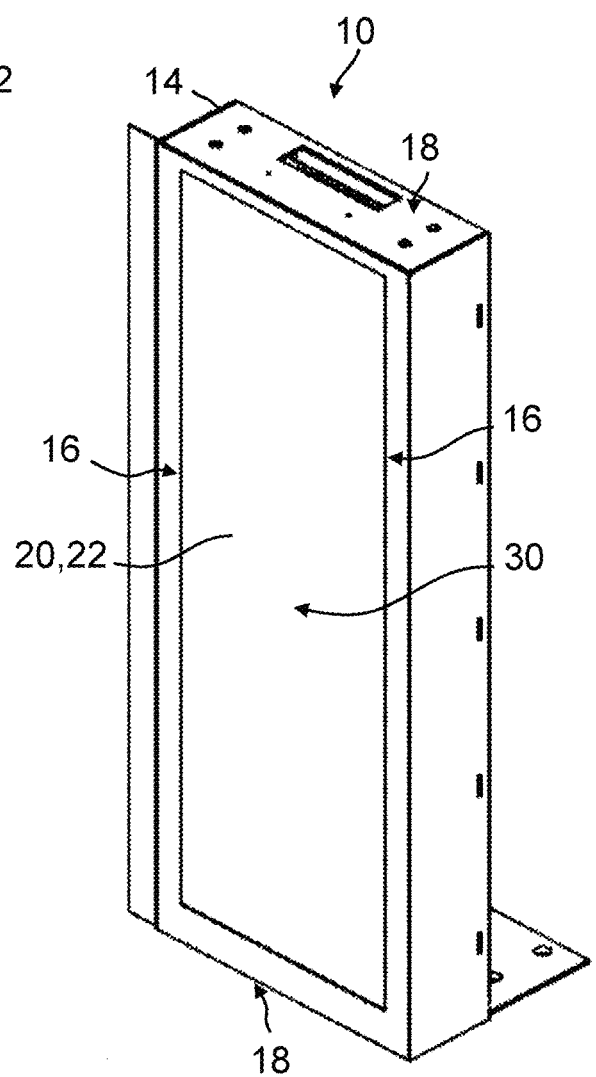
FIG. 3 shows an isometric representation of the luminaire element according to FIG. 1.
Figure 4:
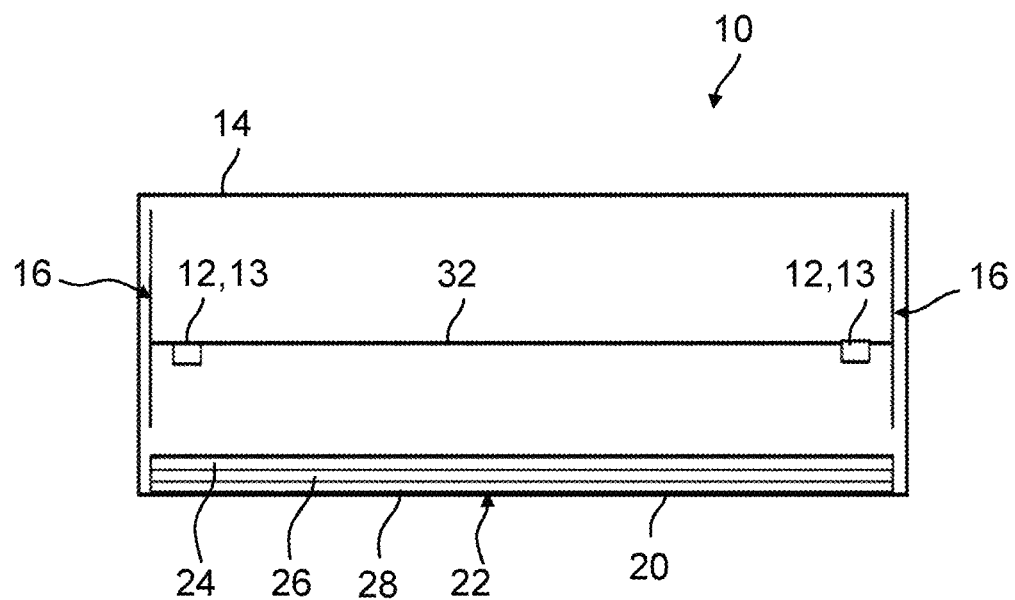
FIG. 4 shows a schematic cross section through the luminaire element in the section plane B-B according to FIG. 1.

FIG. 1 shows a plan view of a luminaire element 10 according to one exemplary embodiment with section lines B-B and D-D indicated, while the luminaire element 10 in FIG. 2 may be seen in longitudinal section in the section plane D-D and in FIG. 3 in an isometric representation. In FIG. 4, a schematic cross section in the section plane B-B through the luminaire element 10 is in this regard represented.

The luminaire element 10 for an inspection tunnel 100 comprises two stripe-like arrangements 12 of light sources 13 in a luminaire housing 14. The luminaire housing 14 comprises two edge regions 16 lying opposite one another along a longitudinal extent L of the luminaire housing 14. The stripe-like arrangements 12 of the light sources 13 are formed along the longitudinal extent L at the edge regions 16, as may be seen particularly in FIG. 2 and FIG. 4. In this way, a light exit surface 20 of the luminaire housing 14 has a higher radiant intensity along the edge regions 16 than in a central region 30.

The light sources 13 may comprise one or more light-emitting diodes and/or fluorescent tubes and/or light guides. The light sources 13 may in this case be configured with variable color, in particular as light-emitting diodes (LEDs) having an adjustable color temperature.

Light-emitting diodes (LEDs), for example mid-power LEDs having a luminous flux of from 20 to 100 lumens and a luminous efficiency of about 180 lumens/watt, may preferably be used as lighting means. Alternatively, however, other designs may also be used according to the fluorescent tube concept.

The light sources 13 are arranged for mechanical fastening on a carrier element 32. The carrier element 32 may in particular be configured to be reflective toward the light exit surface 20 in order to increase the reflection contrasts.

The light exit surface 20 of the luminaire housing 14 is formed by a lens stack 22, which comprises at least a diffuser 24 and a cover lens 28. Preferably, a multiprism lens 26 may also be arranged between the diffuser 24 and the cover lens 28, as may be seen in the exemplary embodiment in FIG. 4.

The luminaire structure is based on the principle of backlighting, the light rays passing, before leaving the luminaire element, through a lens stack 22, which preferably consists of a diffuse lens 24, a multiprism lens 26 and a protective cover lens 28. The multiprism lens may in this case, in particular, be used for additional reduction of a possible dazzling effect for the inspector.

The central region 30 of the light exit surface 20 may advantageously have a lower transparency than the edge region 16. In particular, the central region may be configured opaquely, for example by an opaque stripe, which may also be configured to be reflective toward the light source 13, being applied onto the diffuser.

The luminaire housing 14 comprises end-side terminal regions 18 transversely to the edge regions 16, which are configured to connect neighboring luminaire elements 10, 11. The end-side terminal regions 18 may advantageously be configured as standardized terminal elements for mechanical and/or electrical connection of neighboring luminaire elements 10, 11.

The luminaire housing 14 may be configured to be openable on the rear side, in particular provided with a maintenance opening 34, as is indicated in FIG. 2. Replacement of light sources 13 and/or driver stages may therefore advantageously be carried out from the rear side of the luminaire housing 14.

Alternatively, the luminaire housing 14 may also be configured closed. If replacement of the light sources 13 is therefore not provided, these may also be arranged adhesively bonded on the carrier element 32.

Figure 5:
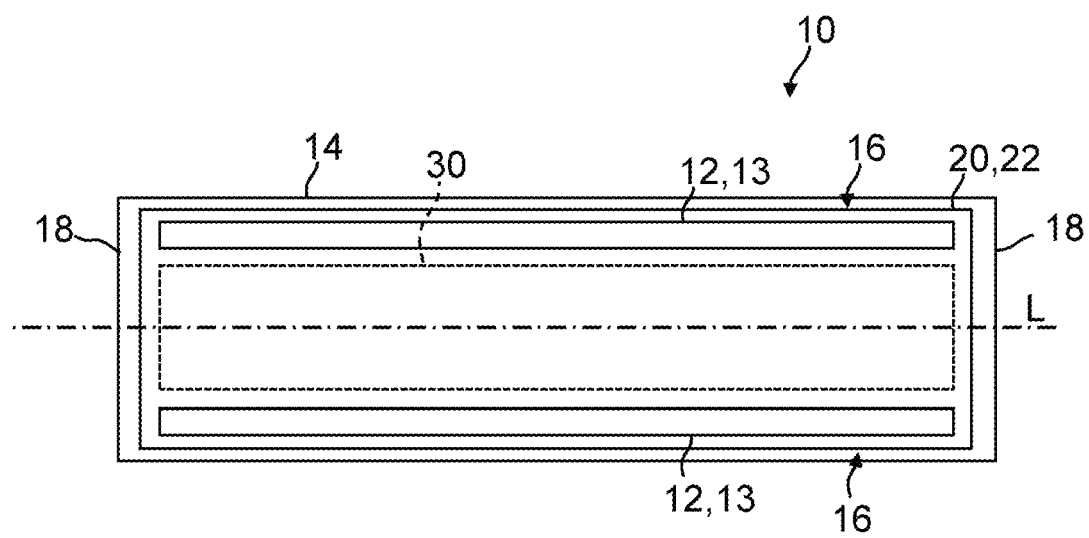
FIG. 5 shows a schematic cross section through a luminaire element according to a further exemplary embodiment of examples disclosed herein.

FIG. 5 shows a schematic cross section from the light exit side 20 through a luminaire element 10 according to a further exemplary embodiment. Arrangements 12 of light sources 13 are arranged along the two edge regions 16. The central region 30 of the light exit surface 20 may advantageously have a lower transparency than the edge region 16. In particular, the central region may be configured opaquely, for example by an opaque stripe, which may also be configured to be reflective toward the light sources 13, being applied onto the diffuser 24, that is to say on the inner side of the layer stack 22.

Figure 6:
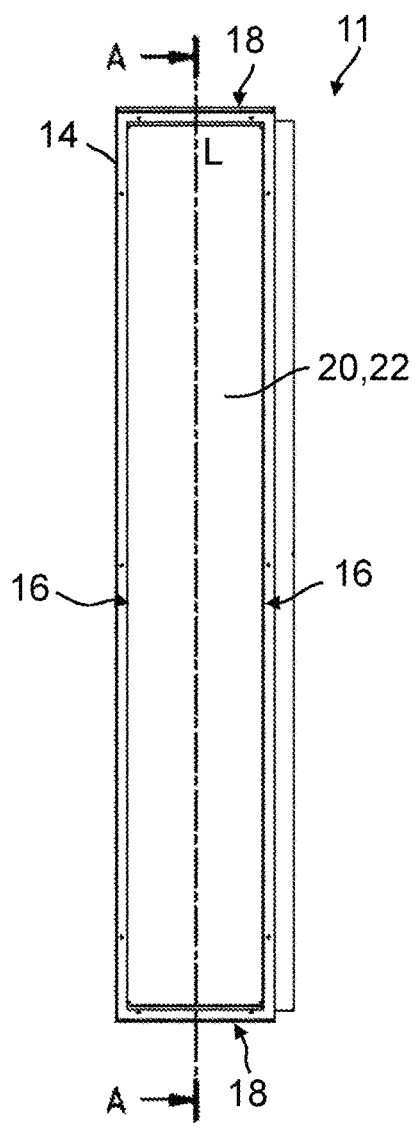
FIG. 6 shows a plan view of a bent luminaire element according to a further exemplary embodiment of examples disclosed herein with a section line A-A indicated.
Figure 7:
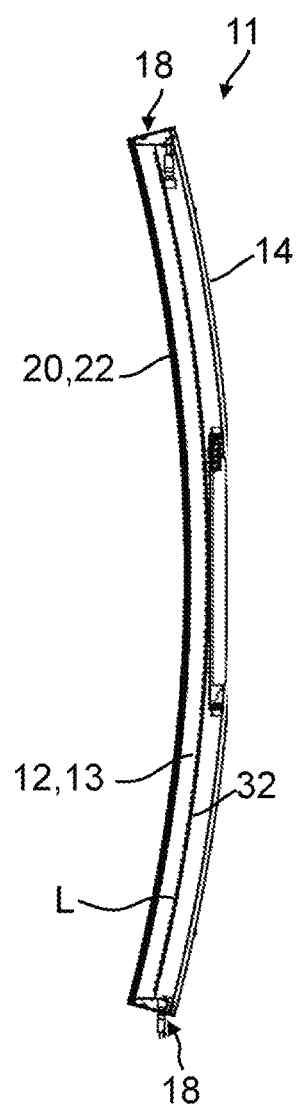
FIG. 7 shows a longitudinal section through the luminaire element according to FIG. 6 in the section plane A-A.

FIG. 6 represents a plan view of a bent luminaire element 11 according to a further exemplary embodiment with a section line A-A indicated. FIG. 7 in this regard shows a longitudinal section in the section plane A-A through the luminaire element 11.

The structure of the bent luminaire element 11 is similar to the structure of the planar luminaire elements 10 represented in FIGS. 1 to 5. The difference is that, in the bent luminaire element 11, the luminaire housing 14 is configured curved in the shape of an arc. The light exit surface 20 is in this case oriented toward a concave inner side of the arc-shaped curvature. The light sources 13 are arranged on the likewise curved luminaire insert 32. The bent luminaire element 11 also comprises terminal regions 18 at its ends, with which the luminaire element 11 may be mechanically and/or electrically connected to subsequent planar and/or bent luminaire elements 10, 11.

Figure 8:
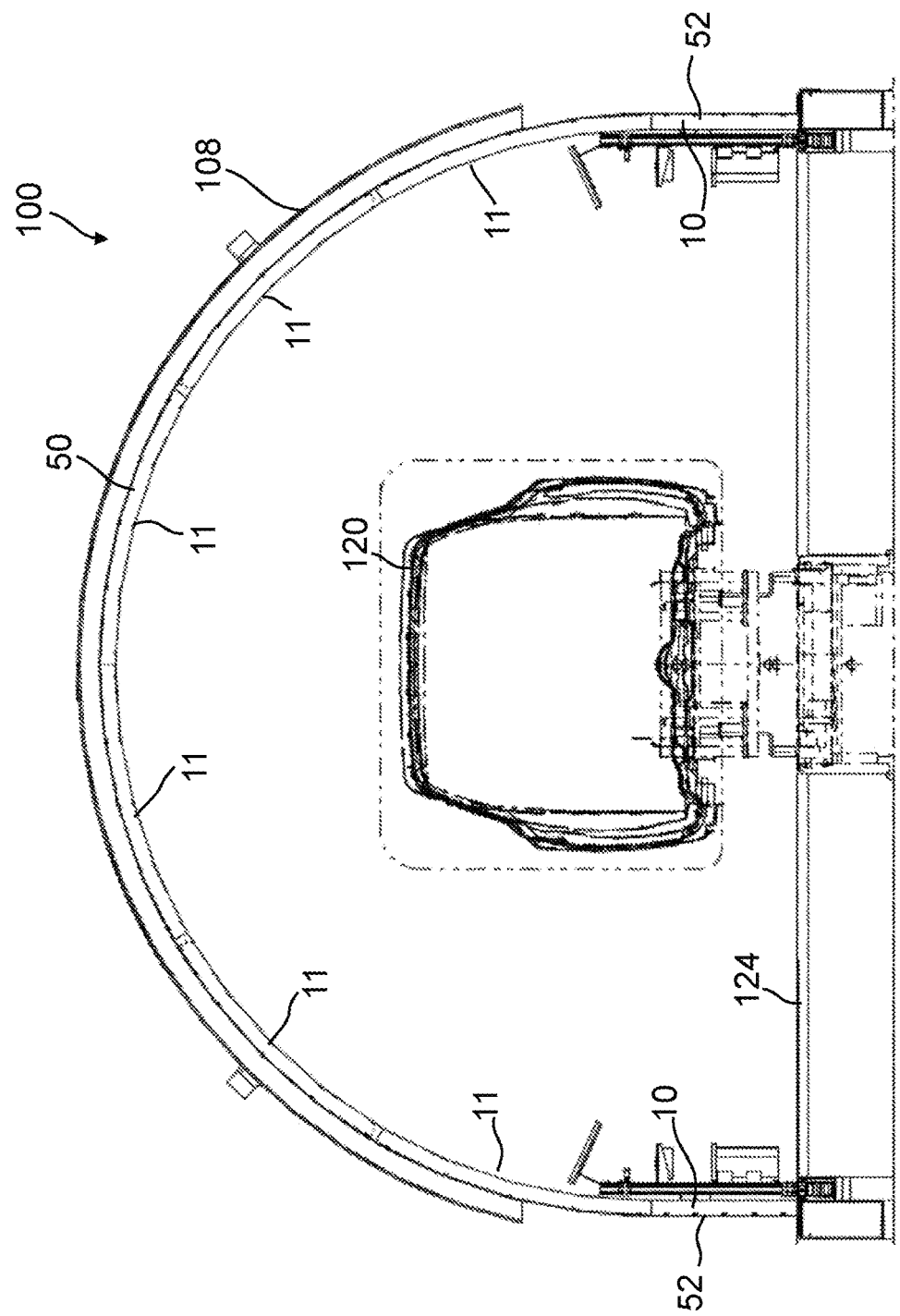
FIG. 8 shows a cross section through an inspection tunnel according to one exemplary embodiment of examples disclosed herein.
Figure 9:
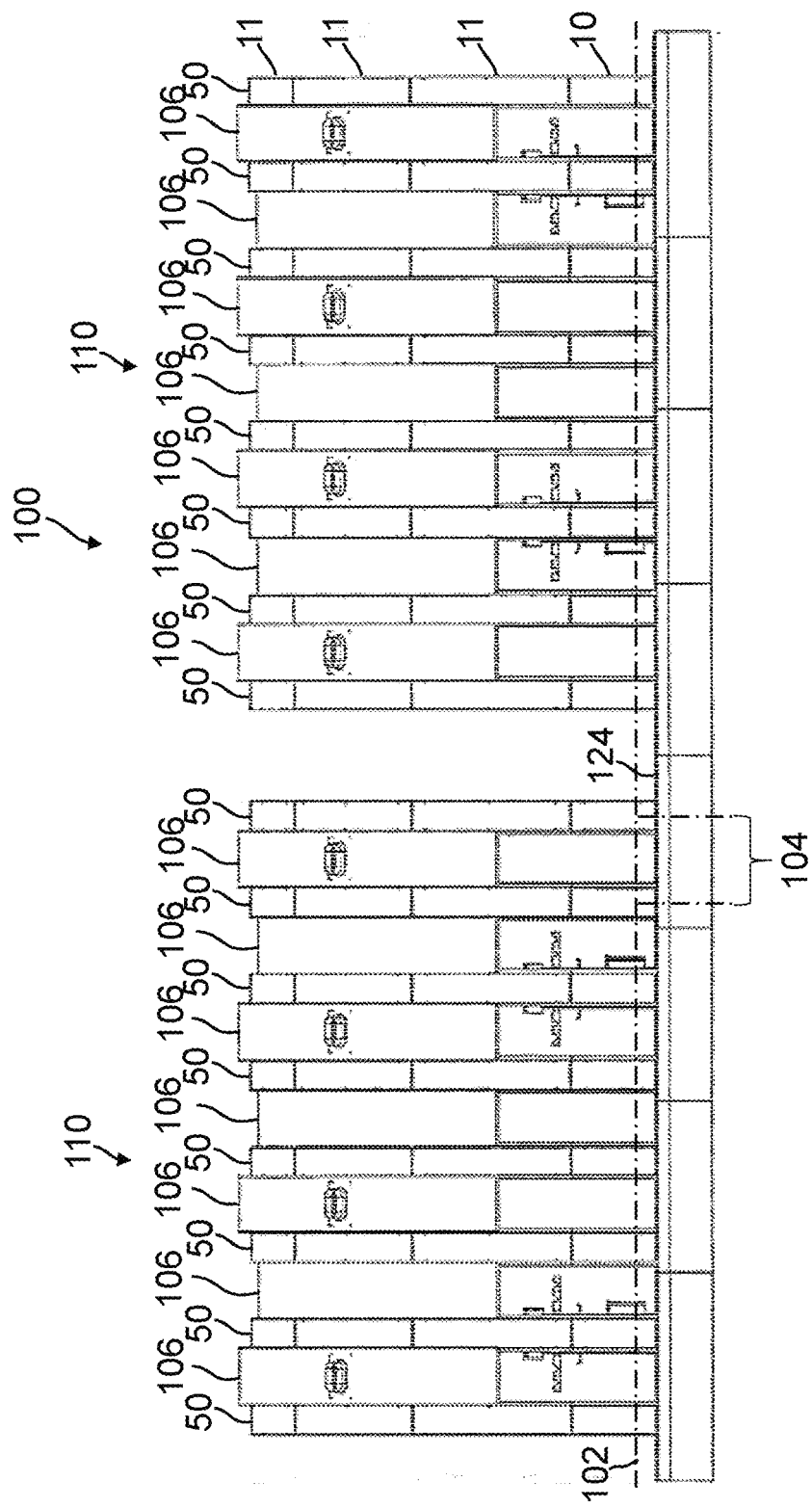
FIG. 9 shows a longitudinal section through the inspection tunnel according to FIG. 8.

FIG. 8 shows a cross section through an inspection tunnel 100 according to one exemplary embodiment, while a corresponding longitudinal section through the inspection tunnel 100 is represented in FIG. 9.

The inspection tunnel is used in particular for the inspection of painted vehicle bodies 120 which pass through the inspection tunnel 100 along a tunnel longitudinal axis 102. The inspection tunnel 100 comprises an arrangement of a plurality of luminaire strips 50, which are arranged next to one another transversely to the tunnel longitudinal axis 102. The light exit surfaces 20 of the luminaire elements 10, 11 are oriented on a concave inner side of the arc-shaped curvature of the tunnel wall 108 toward a central region of the tunnel longitudinal axis 102.

A luminaire strip 50 in this case comprises a plurality of luminaire elements 10, 11, which are connected to one another at their end-side terminal regions 18. In particular, the luminaire elements 10, 11 are arranged at least regionally on a line curved in the shape of an arc, the light exit surfaces 20 of the luminaire elements 10, 11 being oriented toward the concave inner side of the arc-shaped curvature. End pieces 52 of a luminaire strip 50 are in this case formed by planar luminaire elements 10, between which a plurality of curved luminaire elements 11 are arranged.

The individual luminaire elements 10, 11 joined to form a luminaire strip 50, which may for example have an arc-like structure, may thus be screwed to one another on their end sides. For this purpose, for example, 6 bent luminaire elements 11, each with a length of 1420 mm, and 2 planar luminaire elements 10, each of 750 mm, may be used. Because the light exit surface 20 approximately has the length of the luminaire housing 14, only minimal sections on which the light exit surface is interrupted are formed in the circumferential direction. With this virtually continuous light exit surface 20, a reflection image which is advantageous since it is almost uninterrupted may be formed on the substrate.

In order to combine individual luminaire elements 10, 11 having an individual length of for example 1400 mm to form a continuous luminaire strip, to avoid light-free regions these may be screwed together or plugged together on the head sides. Here, for example, the energy supply and the control signals could, for example, be forwarded from one luminaire element 10, 11 to the next via the plug connection.

Because of the concentric arrangement of the luminaire elements 10, 11, the light rays are directed substantially onto the substrate, that is to say for example a painted vehicle body 120. This on the one hand increases the luminous efficiency, and on the other hand reduces the direct dazzling of the inspectors.

The width of the individual luminaire strips 50 may for example be 200 mm, and the free space between the light arcs may for example be 500 mm. In this way, both a sufficiently large number of contrast transitions is available, and sufficient visually "unperturbed" space, which is likewise needed for inspection of the overall substrate.

FIG. 9 shows a cross section of an inspection tunnel 100 having a multiplicity of luminaire strips 50, which are arranged in two so-called measures 110. The two measures 110 are in this case arranged with a certain spacing from one another so that a vehicle body 120 can be inspected simultaneously in both measures 110. The individual luminous strips 50 are arranged separated from one another by regions 106. A measure 110 may, for example, have a length of 6.3 m.

The luminous strips 50 of a measure are arranged spaced apart in a predetermined grid spacing 104, which may for example be 0.70 m, while the spacing between the two measures may for example be 0.8 m.

The regions 106 between the luminaire strips 50 may comprise material or surfaces with predetermined, in particular different reflectances. In particular, reflectances of between 20% and 70%, preferably between 27% and 55%, in relation to a wavelength range of visible light and with normal light incidence, may in this case be provided, in order to obtain a contrast situation which is as good as possible for examination of substrates.

In addition, at least one luminaire strip 50 may be arranged extending parallel to the tunnel longitudinal axis 102 in an inspection tunnel 100, the light exit surfaces 20 of the luminaire elements 10, 11 being aligned toward the tunnel longitudinal axis 102.

Furthermore, it is also possible for luminaire strips 50 to be arranged in the floor 124 in the tunnel longitudinal axis 102 and/or transversely to the tunnel longitudinal axis 102.

Especially for the inspection of, for example, hoods or trunk lids of a body 120, it may be advantageous to install longitudinally fitted luminaire strips 50 since in that case a movement of the checker transversely to the body 120 often takes place. With this natural movement of the checker transversely to the body 120, a bright/dark contrast change therefore takes place without additional head movement.

Figure 10:
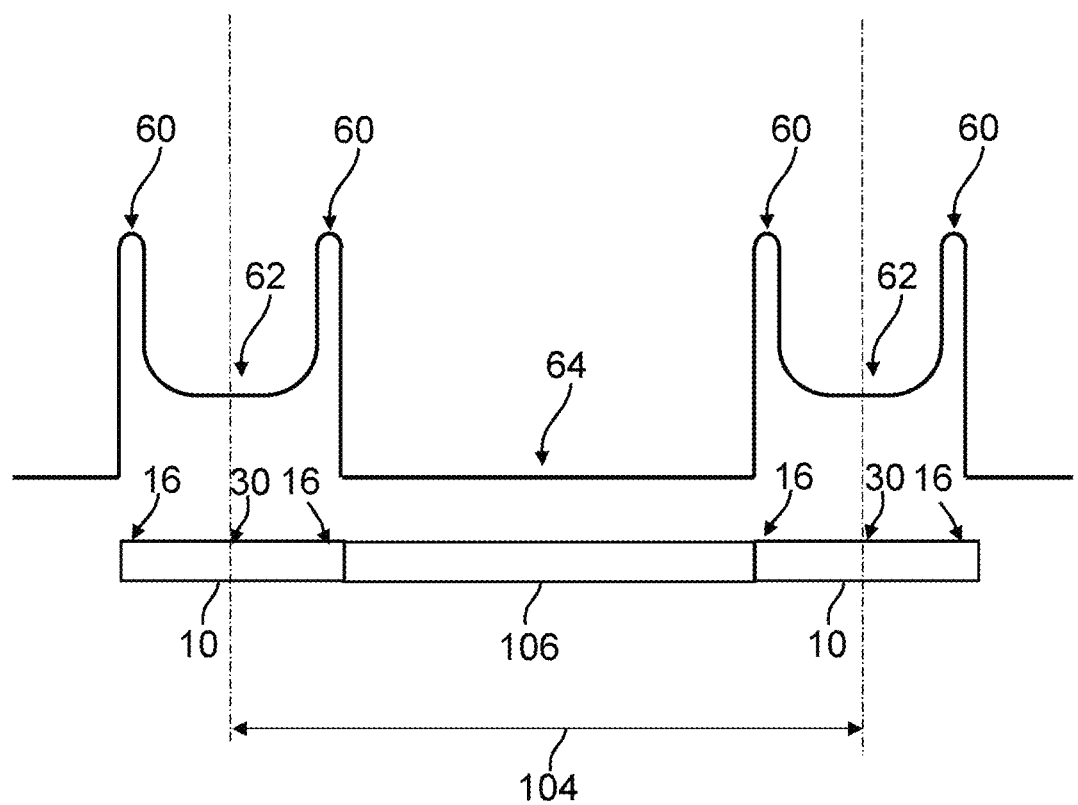
FIG. 10 shows a luminance profile transversely over two luminaire elements according to examples disclosed herein.

FIG. 10 shows a luminance profile transversely over two luminaire elements 10 according to examples disclosed herein, which are arranged spaced apart by a region 106. In this case luminance regions 60 may be seen at the edge regions 16 of the luminaire elements 10 with a very high luminance. The increase and decrease of the luminance take place very steeply in these regions 60, so that a high contrast occurs there, which is conducive to the perception of point faults on a substrate. Between the luminance regions 60 with a high luminance, a region 62 of low luminance may be seen in the central region 30 of the luminaire elements 10. The region 106 between the two luminaire elements 10 comprises a dark region 64.

Light sources 13 having LEDs with a variable color temperature may optionally be used. In this way, for example, the light color may be matched to the hue of the substrate or to the preference of the inspector.

Figure 11:
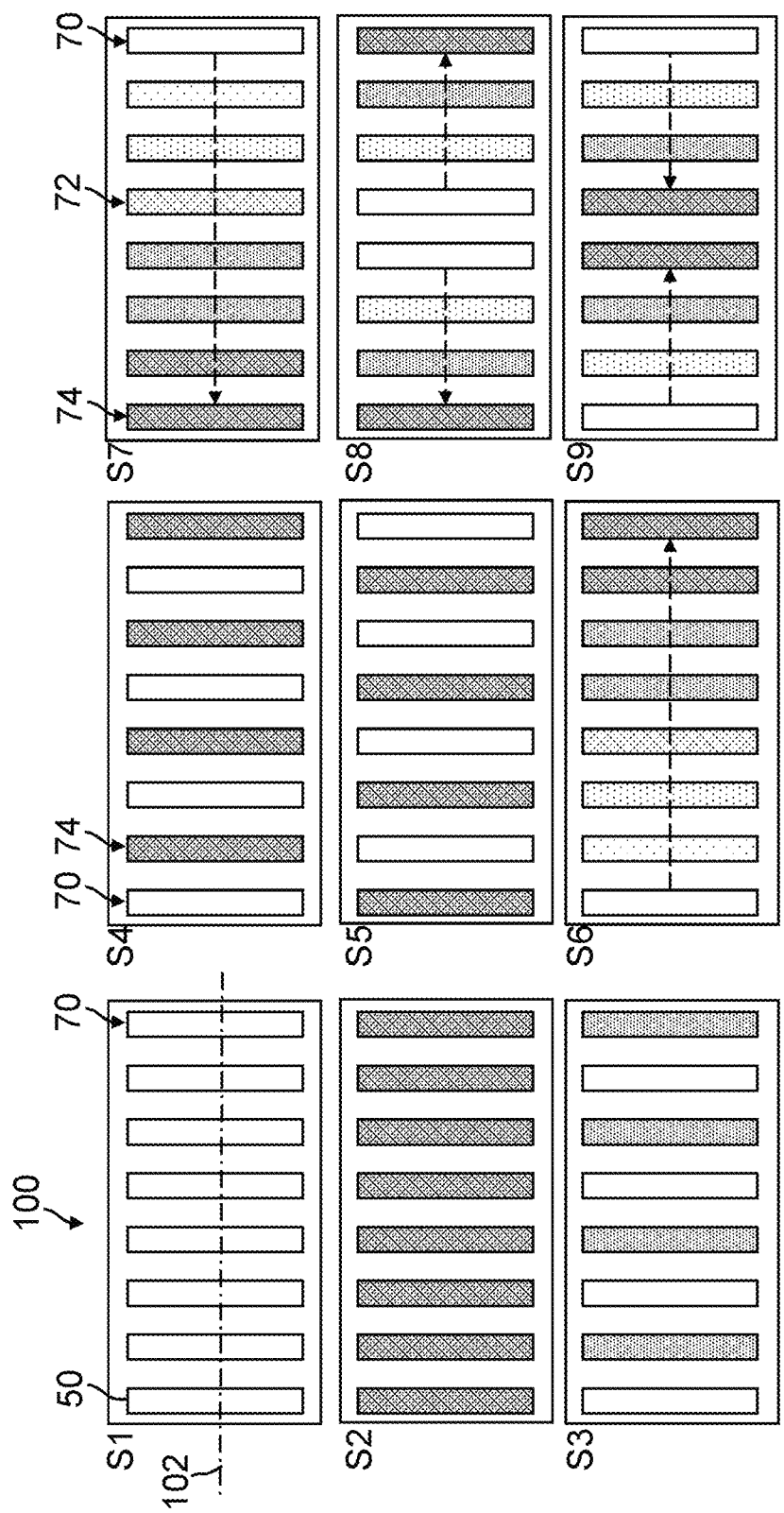
FIG. 11 shows color temperature arrangements of luminaire strips of an inspection tunnel according to one exemplary embodiment of the invention.

Possible color temperature arrangements of luminaire strips 50 of an inspection tunnel 100 according to one exemplary embodiment are represented in FIG. 11.

Luminaire elements 10, 11 of different luminaire strips 50 of an inspection tunnel may comprise light sources 13 with different color temperatures. In particular, the color temperatures may vary in the range of between 2700 K and 6500 K. Neighboring luminaire strips 50 may in this case have alternating sequences of high and low color temperatures.

The light color of the light sources 13 in a luminaire strip 50 may either be fixed or, for example, vary between 2700 K (warm-white) and 6500 K (cold-white). For example, alternately cold-white and warm-white luminaire strips 50 or other sequences may be used.

The luminaire elements 10 may be configured to be dimmable. The degree of dimming may, for example, be tailored to the hue of the substrate. The hue of the luminaire element 10 may be matched to the hue of the substrate.

FIG. 11 represents various possible color temperature arrangements S1 to S9. This representation is not however intended to be restrictive, and other color temperature combinations are readily conceivable.

Luminaire elements 50 with a high color temperature 70 are in this case represented in white, while luminaire elements 50 with a medium color temperature 72 are represented dotted and luminaire elements 50 with a low color temperature 74 are represented densely dotted. Further levels are, however, represented between them. The arrows indicated are intended to illustrate the profile of the color temperatures from high color temperatures 70 to low color temperatures 74. For the sake of clarity, only certain luminaire elements 50 are provided with references.

- 10 luminaire element
- 11 bent luminaire element
- 12 stripe-like arrangement of light sources
- 13 light source
- 14 luminaire housing
- 16 edge region
- 18 terminal region
- 20 light exit surface
- 22 lens stack
- 24 diffuser
- 26 multiprism lens
- 28 cover lens
- 30 central region
- 32 luminaire insert
- 34 maintenance opening
- 50 luminaire strip
- 52 end piece
- 60 high contrast
- 62 low luminosity
- 64 dark region
- 70 high color temperature
- 72 medium color temperature
- 74 low color temperature
- 100 inspection tunnel
- 102 tunnel longitudinal axis
- 104 grid spacing
- 106 region
- 108 tunnel wall
- 110 measure
- 120 vehicle body
- 124 floor
- L longitudinal extent

The invention claimed is:

1. A luminaire element for checking glossy surfaces, in particular painted surfaces, the luminaire element comprising at least two stripe-like arrangements of light sources in a luminaire housing, the luminaire housing having at least two edge regions lying opposite one another along a longitudinal extent of the luminaire housing,
wherein first and second stripe-like arrangements of the light sources extend along the longitudinal extent at the opposing edge regions, the first and second stripe-like arrangements separated by a center region having a reflector positioned between the first and second stripe-like arrangements, wherein the separation of the first and second stripe-like arrangements and light reflected from the first and second stripe-like arrangements via the reflector define a luminance profile with a lower radiant intensity in a central region separating first and second radiant intensity peaks, and wherein the luminance profile includes first and second external regions on opposite sides of the radiant intensity peaks, the external region having a lower radiant intensity than the central region.

2. The luminaire element as claimed in claim 1, wherein the light exit surface of the luminaire housing includes at least a diffuser and a cover lens.

3. The luminaire element as claimed in claim 2, wherein a multiprism lens is arranged between the diffuser and the cover lens.

4. The luminaire element as claimed in claim 1, wherein the light sources include one or more light-emitting diodes and/or one or more fluorescent tubes and/or one or more light guides.

5. The luminaire element as claimed in claim 1, wherein the light sources are configured with variable color, in particular as light-emitting diodes having an adjustable color temperature.

6. The luminaire element as claimed in claim 1, wherein the luminaire housing includes end-side terminal regions transversely to the edge regions, which are configured to connect neighboring luminaire elements.

7. The luminaire element as claimed in claim 6, wherein the end-side terminal regions are configured as standardized terminal elements for mechanical and/or electrical connection of neighboring luminaire elements.

8. The luminaire element as claimed in claim 1, wherein the luminaire housing is configured curved in the shape of an arc, the light exit surface being oriented toward a concave inner side of the arc-shaped curvature.

9. The luminaire element as claimed in claim 1, wherein the central region of the light exit surface has a lower transparency than the edge region, in particular wherein the central region is configured opaquely.

10. The luminaire element as claimed in claim 1, wherein the luminaire housing is configured to be openable on the rear side, in particular wherein the luminaire housing is configured with a maintenance opening on the rear side.

11. The luminaire element as claimed in claim 1, wherein the light sources are arranged on a carrier element, in particular wherein the carrier element is configured to be reflective toward the light exit surface.

12. The luminaire element as claimed in claim 1, wherein the luminaire housing is configured closed and/or the light sources are arranged adhesively bonded on a carrier element.

13. A luminaire strip having an arrangement of luminaire elements as claimed in claim 1, wherein the luminaire elements are connected to one another at their end-side terminal regions, in particular wherein the luminaire elements are arranged at least regionally on a line curved in the shape of an arc, the light exit surfaces of the luminaire elements being oriented toward a concave inner side of the arc-shaped curvature.

14. The luminaire strip as claimed in claim 13, wherein end pieces are formed by planar luminaire elements, between which curved luminaire elements are arranged.

15. An inspection tunnel having a tunnel longitudinal axis, in particular for checking glossy, in particular painted vehicle bodies, having an arrangement of a plurality of luminaire strips as claimed in claim 13, wherein the luminaire strips are arranged next to one another transversely to the tunnel longitudinal axis, the light exit surfaces of the luminaire elements being oriented on a concave inner side of the arc-shaped curvature of a tunnel wall toward a central region of the tunnel longitudinal axis.

16. The inspection tunnel as claimed in claim 15, wherein the luminaire strips are arranged spaced apart in a predetermined grid spacing.

17. The inspection tunnel as claimed in claim 15, wherein luminaire elements of different luminaire strips include light sources with a different color temperature, particularly in the range of between 2700 K and 6500 K, in particular wherein neighboring luminaire strips have alternating sequences of high and low color temperatures.

18. The inspection tunnel as claimed in claim 15, wherein regions between the luminaire strips include surfaces with predetermined, in particular different reflectances, in particular reflectances of between 20% and 70% in relation to a wavelength range of visible light and with normal light incidence.

19. The inspection tunnel as claimed in claim 15, wherein at least one luminaire strip is arranged extending parallel to the tunnel longitudinal axis, the light exit surfaces of the luminaire elements being aligned toward the tunnel longitudinal axis.

20. The inspection tunnel as claimed in claim 15, wherein luminaire strips are arranged in the floor in the tunnel longitudinal axis and/or transversely to the tunnel longitudinal axis.

21. The luminaire element as claimed in claim 1, wherein an entirety of the reflector is positioned between the light sources.

22. The luminaire element as claimed in claim 1, wherein the reflector extends along a first plane that is parallel to a second plane along which the opposing edge regions extend.

23. The luminaire element as claimed in claim 1, wherein the reflector is positioned at a height between a surface to be illuminated by the light sources and the light sources.

* * * * *